US006530402B2

(12) United States Patent
Suzuki et al.

(10) Patent No.: US 6,530,402 B2
(45) Date of Patent: Mar. 11, 2003

(54) FILLING MACHINE

(75) Inventors: Shin Suzuki, Tokyo (JP); Ichiro Mitsutake, Tokyo (JP)

(73) Assignee: Yamatake Corporation ( * ) Notice: Subject to any disclaimer, the term of this patent is extended or adjusted under 35 U.S.C. 154(b) by 0 days.

(21) Appl. No.: 09/875,835

(22) Filed: Jun. 5, 2001

(65) Prior Publication Data

US 2002/0000259 A1 Jan. 3, 2002

(30) Foreign Application Priority Data

Jun. 6, 2000 (JP) ........................................ 2000-168703

(51) Int. Cl.⁷ ................................................ B65B 1/30
(52) U.S. Cl. ........................ 141/94; 141/236; 141/192; 141/234
(58) Field of Search ............................. 141/94, 192, 234, 141/235, 236, 157, 159; 222/71; 73/861.11

(56) References Cited

U.S. PATENT DOCUMENTS 4,333,486 A * 6/1982 Ciccozzi
4,401,141 A * 8/1983 Rosen et al.
4,454,773 A * 6/1984 Brunner et al.
6,378,575 B1 * 4/2002 Marchau

FOREIGN PATENT DOCUMENTS

| JP | 57049812 A | * | 3/1982 |
| JP | 57203917 A | * | 12/1982 |
| JP | 05052621 A | * | 3/1993 |
| JP | 05113357 A | * | 5/1993 |
| JP | 05113358 A | * | 5/1993 |
| JP | 10016903 A | * | 1/1998 |
| JP | 2001194195 A | * | 7/2001 |

* cited by examiner

Primary Examiner—Gregory Huson
Assistant Examiner—Khoa Huynh
(74) Attorney, Agent, or Firm—Blakely Sokoloff Taylor & Zafman

(57) ABSTRACT

To fill containers with fluid with good reproducibility in a short time. It has an exciting frequency setting unit 62 for setting an exciting frequency in each of electromagnetic flow meters at a desired frequency and synchronization units 7, 63 for synchronizing excitation timing in each of the electromagnetic flow meters.

3 Claims, 14 Drawing Sheets

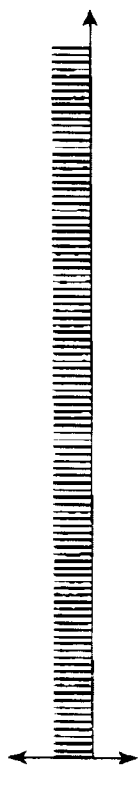
FIG. 3A CLOCK SIGNAL 61s
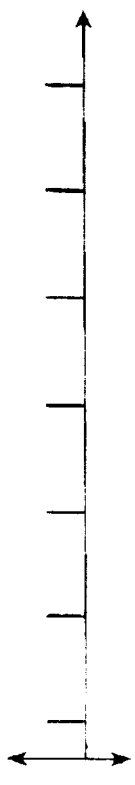
FIG. 3B SYNCHRONOUS SIGNAL 62s
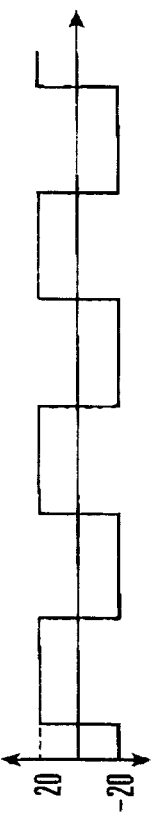
FIG. 3C EXCITING VOLTAGE 63v
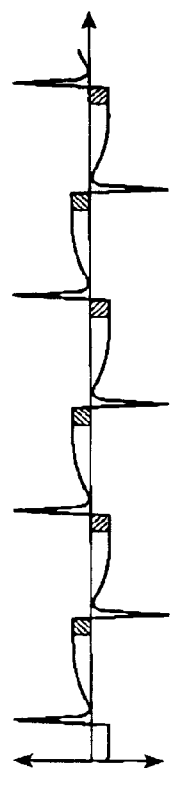
FIG. 3D AC FLOW VELOCITY SIGNAL 65s
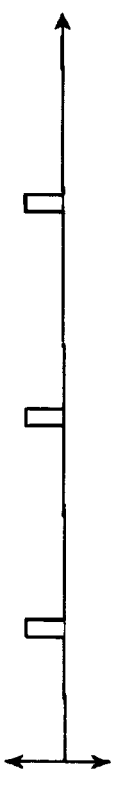
FIG. 3E SAMPLING SIGNAL 64s
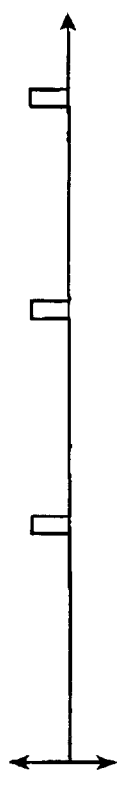
FIG. 3F SAMPLING SIGNAL 64t
FIG. 3G DC FLOW VELOCITY SIGNAL 66s

FIG.4A
CONVERTER 6b
EXCITING VOLTAGE 63 v
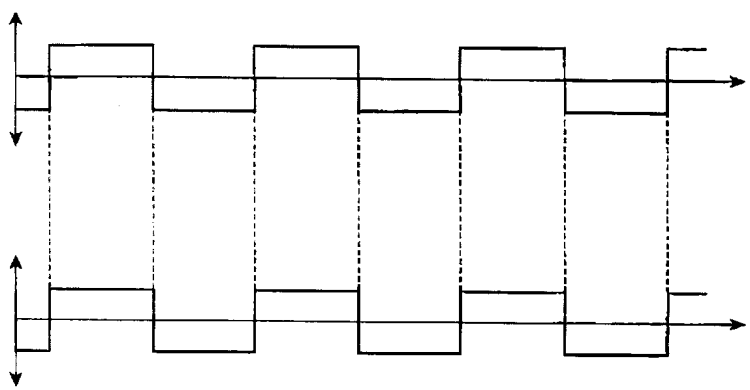
FIG.4B
CONVERTER 6a
EXCITING VOLTAGE 63 v
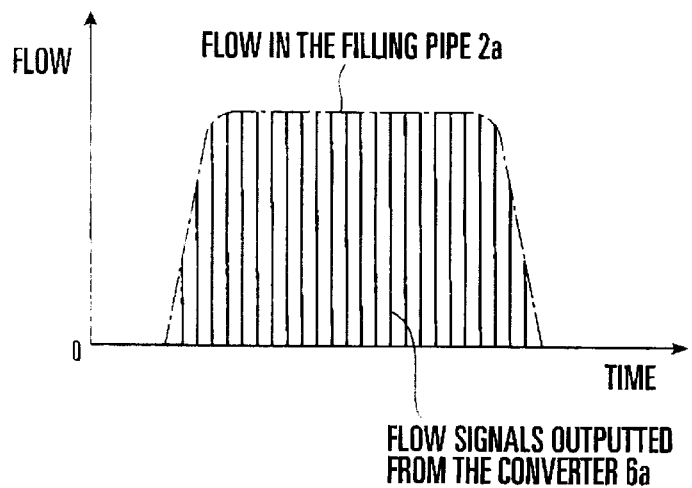
FIG.5

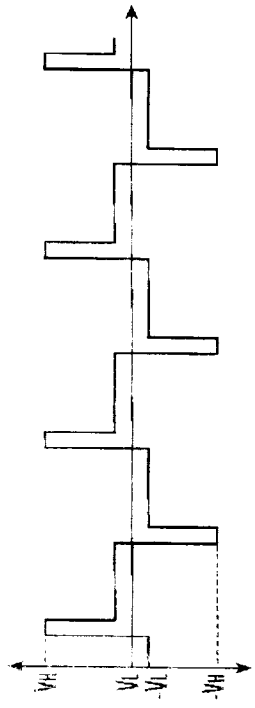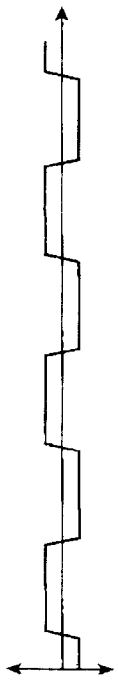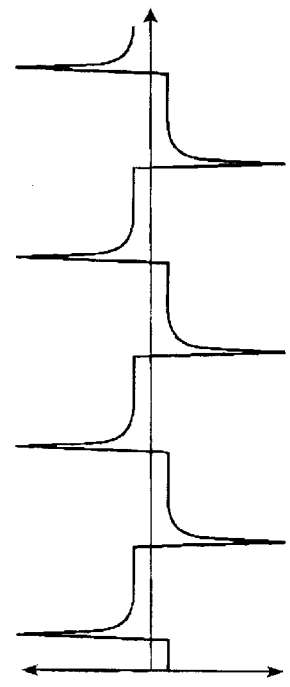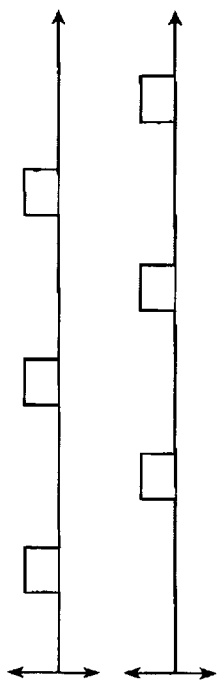
FIG.6A  EXCITING VOLTAGE 63vv
FIG.6B  AC FLOW VELOCITY SIGNAL NOT INCLUDING NOISE
FIG.6C  AC FLOW VELOCITY SIGNAL 65ss
FIG.6D  SAMPLING SIGNAL 64ss
FIG.6E  SAMPLING SIGNAL 64tt
FIG.6F  DC FLOW VELOCITY SIGNAL 66ss AC POWER CURRENT 109c TIMING SIGNAL 171s CONVERTER 106b TIMING SIGNAL 162s CONVERTER 106a TIMING SIGNAL 162s AC FLOW VELOCITY SIGNAL 65s

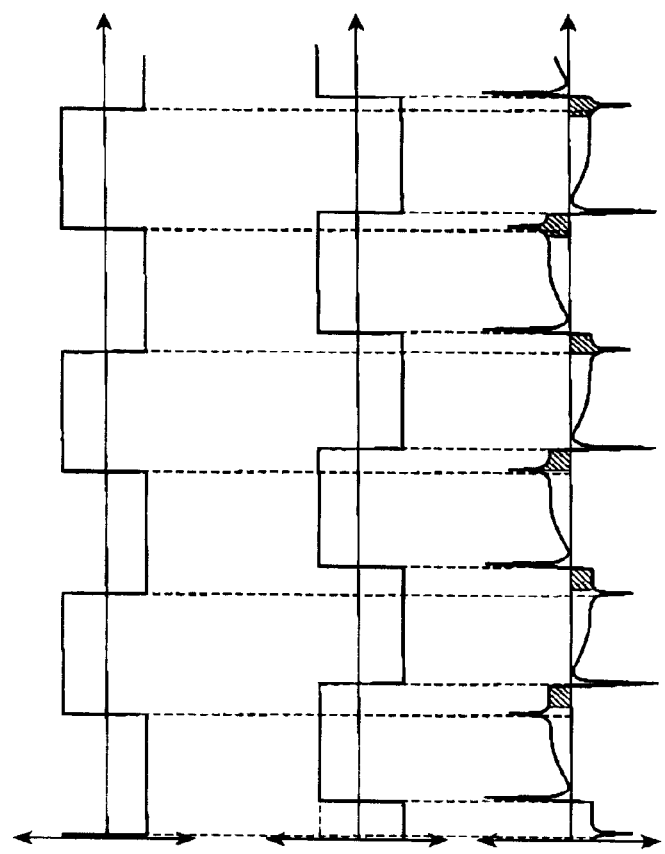

FILLING MACHINE

BACKGROUND OF THE INVENTION

The present invention relates to a filling machine for filling a plurality of containers with fluid such as beverages or drugs, and in particular, to, a filling machine for monitoring a flow of fluid injected into each container by using an electromagnetic flow meter in order to fill each container with a fixed amount of fluid.

As a method of controlling fluid filled in each container to be a fixed amount, there are a method of monitoring weight of a container in which the fluid is injected and a method of monitoring a flow through a filling pipe for injecting the fluid into the container. As for the method of monitoring a flow, a vortex flow meter, an oval flow meter, an electromagnetic flow meter and so on can be utilized as a flow meter. As the vortex flow meter and the oval flow meter have structures in a channel, there may be deposits generated in the channel. For this reason, it is not desirable to use the vortex flow meter and the oval flow meter from the viewpoint of sanitation and maintenance. Thus, a filling machine using an electromagnetic flow meter having no structures in the channel is commercialized.

FIG. 12 is a block diagram showing overall configuration of a conventional filling machine using the electromagnetic flow meter.

This filling machine has a plurality of filling pipes $202a$ to $202n$ placed thereon. The filling pipes $202a$ to $202n$ have valves $203a$ to $203n$ provided respectively. In addition, the filling pipes $202a$ to $202n$ have the electromagnetic flow meters comprised of detectors $205a$ to $205n$ and converters $206a$ to $206n$ provided respectively. The electromagnetic flow meters of the filling pipes $202a$ to $202n$ calculate a flow in filling pipes $202a$ to $202n$ based on electromotive force generated by applying an alternating field to fluid in the filling pipes $202a$ to $202n$ respectively. Flow signals indicating the flows calculated by the converters $206a$ to $206n$ are outputted to control sections $208a$ to $208n$ respectively.

The control sections $208a$ to $208n$ control opening and closing of the valves $203a$ to $203n$ provided for the filling pipes $202a$ to $202n$ respectively. The control sections $208a$ to $208n$ open the valves $203a$ to $203n$ respectively, and then calculate a total sum of the fluid injected into containers $201a$ to $201n$ based on the flow signals outputted from converters $206a$ to $206n$ of the electromagnetic flow meters, and close the valves $203a$ to $203n$ when the total sum reaches a set value. The above set value with reference to which the control sections $208a$ to $208n$ close the valves $203a$ to $203n$ is individually adjusted at the control sections $208a$ to $208n$ before operation of the filling machine so as to fill all the containers $201a$ to $201n$ with a fixed amount of the fluid even if temperature, humidity and so on change.

Next, the electromagnetic flow meter used for the conventional filling machine shown in FIG. 12 will be further described. While the electromagnetic flow meter comprised of the detector $205a$ and the converter $206a$ will be described as an example hereafter, the electromagnetic flow meters comprised of the detectors $205b$ to $205n$ and the converters $206b$ to $206n$ also have the same configuration respectively.

FIG. 13 is a block diagram showing an example of configuration of the electromagnetic flow meter comprised of the detector $205a$ and the converter $206a$.

An exciting current $263c$ of a predetermined frequency is outputted from an exciting section $263$ to exciting coils $251a$, $251b$ (a frequency of the exciting current $263c$ is referred to as an exciting frequency). The exciting coils $251a$, $251b$ are excited by the exciting current $263c$ to generate an alternating field. If such a magnetic field is applied to the fluid in the filling pipe $202a$, electromotive force having an amplitude proportionate to average flow velocity is generated by electromagnetic induction in a direction orthogonal to both the directions of the magnetic field and of the flow of the fluid. An AC voltage signal based on this electromotive force is taken out by electrodes $252a$, $252b$ mounted opposite an inner wall of the filling pipe $202a$.

The AC voltage signal taken out by electrodes $252a$, $252b$ is AC-amplified by an amplifier $265$ and is outputted as an AC flow velocity signal $265s$ to a sample hold section $266$. On the other hand, sampling signals $264s$, $264t$ are outputted from a sampling control section $264$ to the sample hold section $266$. The sampling signals $264s$, $264t$ are the signals indicating timings for sampling a positive side and a negative side of the AC flow velocity signal $265s$ respectively, and have the same frequency as the exciting frequency. In the sample hold section $266$, the AC flow velocity signal $265s$ is sampled according to the sampling signals $264s$, $264t$, and a DC flow velocity signal $266s$ of which DC potential changes according to the average flow velocity is outputted.

The DC flow velocity signal $266s$ outputted from the sample hold section $266$ is converted into a digital signal by an A/D converter $267$ and then inputted to a processor $268$. The processor $268$ calculates an average flow in the filling pipe $202a$ by performing predetermined processing to the input signal. The digital signal indicating this average flow has the same frequency as the exciting frequency, and is outputted as a flow signal from an output section $269$ to the control section $208a$ shown in FIG. 12.

FIG. 14 is a timing chart showing signals of the sections of the electromagnetic flow meter shown in FIG. 13, where (A) is a voltage (hereafter, referred to as an exciting voltage) $263v$ applied to the exciting coils $251a$, $251b$ by the exciting section $263$, (B) is the AC flow velocity signal $265s$ outputted from the amplifier $265$, (C) and (D) are the sampling signals $264s$, $264t$ outputted from the sampling control section $264$ respectively, and (E) is the DC flow velocity signal $266s$ outputted from the sample hold section $266$.

As the exciting voltage $263v$ is a rectangular wave as shown in FIG. 14(A), differential noise occurs when polarity of the exciting voltage $263v$ switches. This differential noise is superimposed on the AC voltage signal based on the electromotive force generated by magnetic field application. Therefore, a spike appears at the beginning of each pulse of the AC flow velocity signal $265s$ as shown by solid lines in FIG. 14(B).

In addition, in the case where commercial power is supplied to the electromagnetic flow meter shown in FIG. 13, the AC noise derived from this commercial power is superimposed on the AC flow velocity signal $265s$ via the filling pipe $202a$. However, if the frequency of the exciting voltage $263v$ is 1/(an even number) of the frequency of the commercial power, an error based on the AC noise can be eliminated. Moreover, the dotted lines in FIG. 14(B) indicate waveforms in the cases where the frequency Of the exciting voltage $263v$ is ½ of the frequency of the commercial power, that is, 25 Hz or 30 Hz.

Thus, the electromagnetic flow meter shown in FIG. 13 has a timing signal generating section $262$ for extracting timing from commercial power $209$. This timing signal generating section 262 generates a timing signal 262a of 50 Hz or 60 Hz for instance based on the timing extracted from commercial power 209. This timing signal 262a controls timing of the exciting section 263 and the sampling control section 264. At this time, it is possible, by setting sampling periods by the sampling signals 264s, 264t at the end of each pulse of the AC flow velocity signal 265s as shown in FIG. 14(C) and (D), to eliminate both an error based on the differential noise and an error based on the AC noise.

In this case, however, the frequency at which the flow signals are outputted from the converter 206a is 25 Hz or 30 Hz at most as with the exciting frequency. FIG. 15 is a diagram showing a relationship between the flow in the filling pipe 202a from opening till closing of the valve 203a (alternate long and short dash line) and the flow signals outputted from the converter 206a (solid lines). The horizontal axis of this diagram is time, and the vertical axis is a flow. As seen from this diagram, in the case of estimating the amount injected into the container 201a from the flow signals, errors become significant if the frequency of the flow signals is small. There has been a problem that, in the case of reducing filling time by increasing a flow per unit time or in the case of filling a small container with fluid, the errors become so significant at the above frequency that all the containers 201a to 201n cannot be filled with a fixed amount of fluid with good reproducibility.

FIG. 16 is a block diagram showing another example of configuration of the electromagnetic flow meter comprised of the detector 205a and the converter 206a. This diagram shows the same sections as in FIG. 13 by using the same symbols.

In the electromagnetic flow meter shown in FIG. 16, a timing signal generating section 362 performs frequency division of a clock signal 361s outputted from a clock signal generating section 361 to generate a timing signal 362s. It is possible to render the frequency of the timing signal 362s higher than 50 Hz or 60 Hz by adjusting a ratio of frequency division. Thus, It is possible to render the output frequency (that is, an exciting frequency) of the flow signal higher than 25 Hz or 30 Hz.

However, in the case of using the electromagnetic flow meter shown in FIG. 16 for a filling machine, there has been the following problem. FIG. 17 is a timing chart for describing this problem, where (A) is the exciting voltage 263v of the converter 206b, (B) and (C) are the exciting voltage 263v of the converter 206a and the AC flow velocity signal 265s. The converters 206a and 206b are the converters of the electromagnetic flow meters provided for adjacent filling pipes 202a and 202b respectively.

The filling machine shown in FIG. 12 has the filling pipes 202a to 202n placed adjacently since it is necessary to consecutively fill a plurality of containers 201a to 201n. In particular, in the case where the containers 201a to 201n are small, degree of adhesion of the filling pipes 202a to 202n becomes considerably high. In such a case, the differential noise occurring on switching rectangular wave excitation mutually affect the electromagnetic flow meters as leakage flux from the exciting coils 251a, 251b.

On the other hand, in the case of the electromagnetic flow meter shown in FIG. 16, the converters 206a to 206n determine excitation timing based on the individual clock signal 361s so that minute variations arise in the exciting frequencies among the electromagnetic flow meters. In such a case, even if excitation of the converters 206a to 206n is in synchronization at the beginning, there arise variations gradually over the course of time. And if polarity of the exciting voltage 263v of the converter 206b switches during the sampling period (the diagonally shaded area in FIG. 17 (C)) of the converter 206a (FIG. 17 (A)), an error is included in the flow signal from the converter 206a. A spike occurs to the AC flow velocity signal 265s due to an effect of the differential noise from the adjacent electromagnetic flow meter, and the spike is sampled.

The error included in the flow signal at this time is an uncertain error, which cannot be eliminated even by adjustment before operation of the filling machine. For this reason, amounts of filling vary among a plurality of containers 201a, which are sequentially filled with fluid from the filling pipe 202a. To be more specific, there has been a problem that the reproducibility of the amounts of filling deteriorates if the electromagnetic flow meter shown in FIG. 16 is used.

SUMMARY OF THE INVENTION

The present invention has been devised in order to solve such conventional problems, and its object is to provide the filling machine capable of filling with fluid in a short time with good reproducibility. Another object is to provide the filling machine capable of filling a small container with fluid with good reproducibility.

To attain such objects, the filling machine of the present invention has a plurality of filling pipes placed in proximity to one another for injecting fluid into each of a plurality of containers, a valve provided for each of the filling pipes for opening and closing each of the filling pipes based on an open signal and a close signal respectively, an electromagnetic flow meter provided for each of the filling pipes for calculating a flow based on electromotive force generated by applying an alternating field to the fluid in each of the filling pipes and outputting a flow signal, a control means for outputting the open signal to each of the valves, and also outputting the close signal to each of the valves based on the flow signal outputted from each of the electromagnetic flow meters after outputting the open signal so as to fill each of the containers with a fixed amount of the fluid, exciting frequency setting means for setting an exciting frequency in each of the electromagnetic flow meters at a desired frequency, and synchronization means for synchronizing excitation timing in each of the electromagnetic flow meters. Such configuration allows the excitation timing to be synchronized among the electromagnetic flow meters even if the exciting frequency is set higher 25 Hz or 30 Hz for instance. Thus, it can prevent the effect of the differential noise from the adjacent electromagnetic flow meter from being given to the flow signal.

In this case, the exciting frequency setting means is comprised of a synchronous signal generating means included in one of the electromagnetic flow meters for generating a synchronous signal having a frequency of the desired value by performing frequency division of a clock signal of this electromagnetic flow meter, and the synchronization means is comprised of a synchronous signal line for transmitting the synchronous signal generated in one of the electromagnetic flow meters to all the other electromagnetic flow meters and exciting means included in each of the electromagnetic flow meters for performing excitation in synchronization with the synchronous signal. Such configuration allows excitation of all the electromagnetic flow meters to be in synchronization with the synchronous signal generated by one electromagnetic flow meter.

Or the exciting frequency setting means is comprised of a timing signal generating means included in each of the electromagnetic flow meters for generating a first timing signal having a frequency of the desired value by performing frequency division of the clock signal of the electromagnetic flow meter, and the synchronization means is comprised of a timing correcting means included in each of the electromagnetic flow meters for correcting timing of the first timing signal in a predetermined cycle based on an AC signal acquired in common by all of the electromagnetic flow meters and exciting means included in each of the electromagnetic flow meters for performing excitation in synchronization with the first timing signal. Even if variations arise to timing of the first timing signal generated by each of the electromagnetic flow meters, they can be corrected based on an AC signal acquired in common by the electromagnetic flow meters, and so it allows excitation of all the electromagnetic flow meters to be in synchronization.

In this case, the AC signal utilized by said synchronization means is an AC current supplied in common from an AC power supply to each of the electromagnetic flow meters. Or it Is AC noise generated by the AC current outputted from an AC power supply.

In addition, the timing correcting means of the synchronization means has means for extracting a second timing signal from the AC signal and means for correcting the timing of the first timing signal at a point in time when the timing of the first timing signal and the timing of the second timing signal approximately correspond with each other.

BRIEF DESCRIPTION OF THE DRAWINGS

FIG. 2 is a block diagram showing configuration of an electromagnetic flow meter comprised of the detector 5a and the converter 6a;

FIG. 3 is a timing chart showing signals of the sections of the electromagnetic flow meter shown in FIG. 2:

FIG. 4 is a timing chart showing a phase relationship between the exciting voltages of the converters of the electromagnetic flow meters provided for the adjacent filling pipes;

FIG. 5 is a diagram showing a relationship between the flows in the filling pipe and the flow signals;

FIG. 6 is a timing chart showing signals of the sections of the electromagnetic flow meter in the case where excitation is performed by using the exciting voltage of other waveforms;

FIG. 17 is a timing chart for describing a problem in the case of using the electromagnetic flow meter shown in FIG. 16 for the filling machine.

DESCRIPTION OF THE PREFERRED EMBODIMENT

Figure 1:
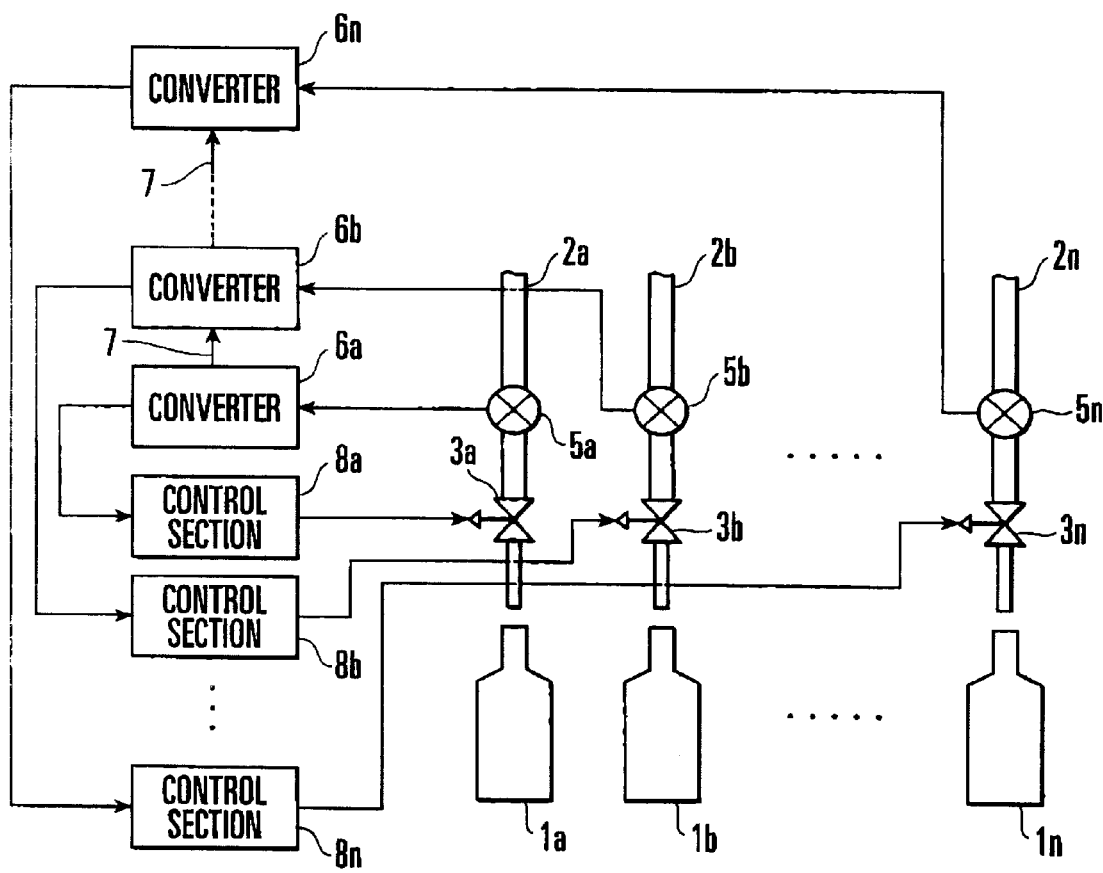
FIG. 1 is a block diagram showing overall configuration of a filling machine of the first embodiment of the present invention.

Embodiments of the present invention will be described in detail hereafter by referring to the drawings. Here, "filling" means injecting a predetermined amount of fluid into a container and not necessarily making the container full of fluid.

First Embodiment

FIG. 1 is a block diagram showing overall configuration of a filling machine of the first embodiment of the present invention.

This filling machine has a plurality of filling pipes 2a to 2n placed thereon. The filling pipes 2a to 2n are for the purpose of injecting conductive fluid such as beverages or drugs into a plurality of containers 1a to 1n respectively. The filling pipes 2a to 2n have valves 3a to 3n provided respectively. The valves 3a to 3n open and close the filling pipes 2a to 2n respectively based on later mentioned open and close signals to control injection of fluid into the containers 1a to 1n.

In addition, the filling pipes 2a to 2n have electromagnetic flow meters provided respectively. The electromagnetic flow meters of the filling pipes 2a to 2n are comprised of detectors 5a to 5n and converters 6a to 6n, respectively. As the filling pipes 2a to 2n are close to one another, the detectors 5a to 5n mounted thereon are also close to one another. The converters 6a to 6n are connected by a synchronous signal line 7.

The detectors 5a to 5n apply an alternating field to the fluid in the filling pipes 2a to 2n respectively and outputs an AC voltage signal based on the electromotive force generated thereby to the converters 6a to 6n. Moreover, the converters 6a to 6n process the AC voltage signals outputted from the detectors 5a to 5n respectively so as to calculate flows in the filling pipes 2a to 2n. Flow signals indicating the flows calculated by the converters 6a to 6n are outputted to control sections 8a to 8n respectively.

The control sections 8a to 8n outputs open and close signals to the valves 3a to 3n provided for the filling pipes 2a to 2n respectively. The control sections 8a to 8n open the valves 3a to 3n by outputting an open signal, and then calculate a total sum of the fluid injected into containers 1a to 1n respectively based on the flow signals outputted from the converters 6a to 6n of the electromagnetic flow meters, and close the valves 3a to 3n by outputting a close signal respectively when the total sum reaches a set value. The above set value with reference to which the control sections 8a to 8n output the close signal is individually adjusted at the control sections 8a to an before operation of the filling machine so as to fill all the containers 1a to 1n with a fixed amount of the fluid even if temperature, humidity and so on change.

Figure 2:
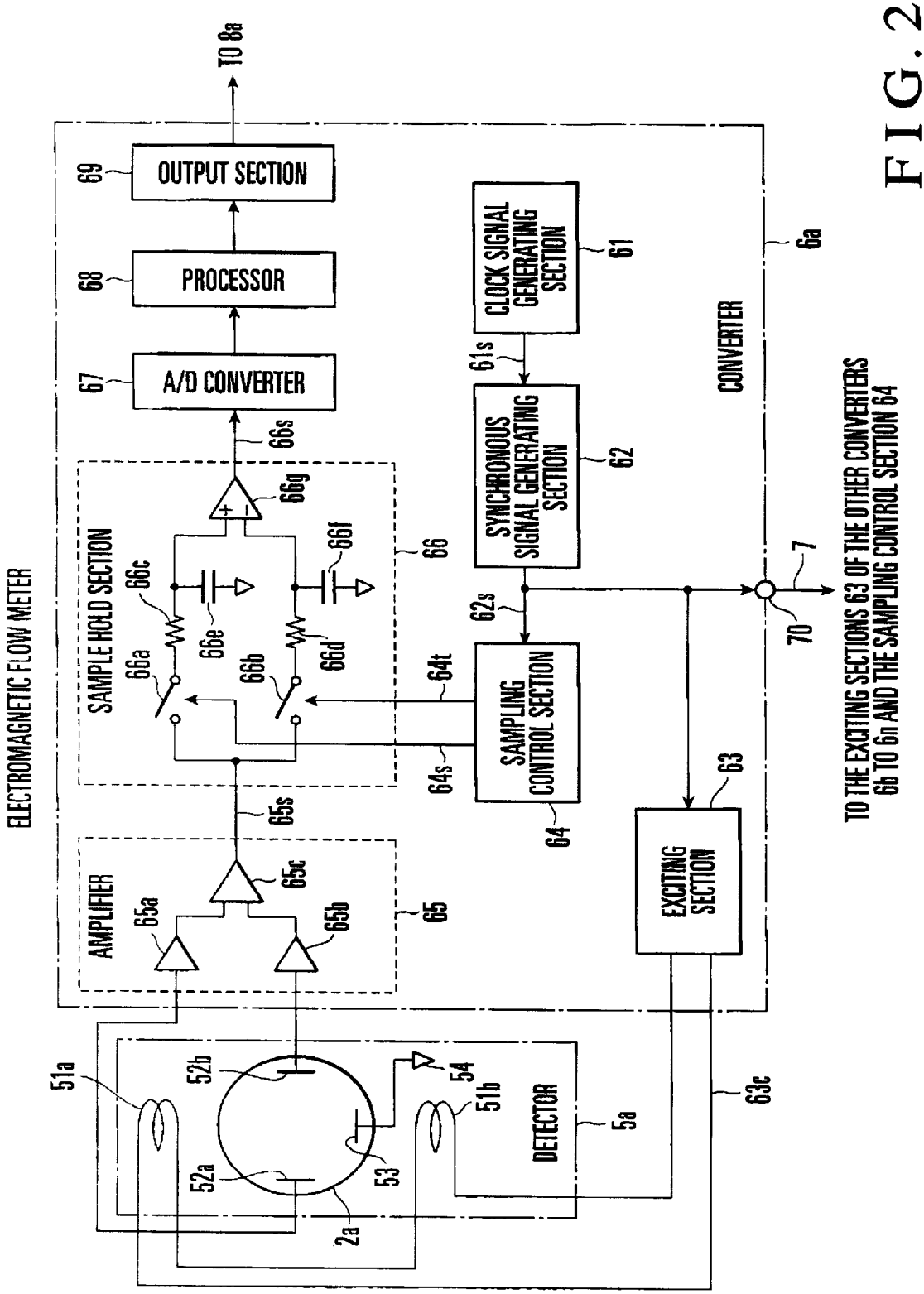

Next, the electromagnetic flow meter used for the filling machine shown in FIG. 1 will be further described. FIG. 2 is a block diagram showing configuration of the electromagnetic flow meter comprised of the detector 5a and the converter 6a.

The detector 5a is comprised of exciting coils 51a, 51b, electrodes 52a, 52b and an earth ring 53. The exciting coils 51a, 51b are a pair of coils for generating an alternating field by getting excited by an exciting current 63c and is placed in the rim of the filling pipe 2a so that the direction of the generated magnetic field will be orthogonal to the flow direction inside the filling pipe 2a. The electrodes 52a, 52b have their ends facing an inner wall of the filling pipe 2a and are mounted in a direction to be orthogonal to the magnetic fields distributed in the filling pipe 2a. The earth ring 53 is intended to enhance precision of signal detection by the electrodes 52a, 52b and is electrically connected to a reference potential 54.

The converter 6a is comprised of a clock signal generating section 61, a synchronous signal generating section 62, an exciting section 63, a sampling control section 64, an amplifier 65, a sample hold section 66, an A/D converter 67, a processor 68, an output section 69 and a synchronous signal input-output terminal 70.

The clock signal generating section 61 outputs a clock signal 61s that is a reference to operation of the converter 6a.

The synchronous signal generating section 62 performs frequency division of a clock signal 61s outputted from the clock signal generating section 61 to generate a synchronous signal 62s of a desired frequency. However, the synchronous signal generating section 62 is ON/OFF switchable, and the synchronous signal generating section 62 of only one of the converters 6a to 6n is set at ON. Here, it is assumed for the sake of description that only the synchronous signal generating section 62 of the converter 6a is set at ON, and the synchronous signal generating sections 62 of the other converters 6b to 6n are set at OFF.

The exciting section 63 applies a voltage of a predetermined frequency (hereafter, referred to as an exciting voltage) 63v to the exciting coils 51a, 51b of the detector 5a and supplies the exciting current 63c thereto. This exciting section 63 synchronizes with the synchronous signal 62s outputted from the synchronous signal generating section 62 to switch polarity of the exciting voltage 63v.

The sampling control section 64 generates sampling signals 64s, 64t for turning on switches 66a, 66b of the sample hold section 66 based on the synchronous signal 62s outputted from the synchronous signal generating section 62. Frequencies of the sampling signals 64s, 64t are both ½ of the frequency of the synchronous signal, and phases of the sampling signals 64s, 64t are mutually deviated by half a cycle.

In addition, as for connection among the synchronous signal generating section 62, the exciting section 63 and the sampling control section 64, they are connected via the synchronous signal input-output terminal 70 to the synchronous signal line 7 for transmitting the synchronous signal 62s to the converters 6b to 6n of all the he other electromagnetic flow meters.

The amplifier 65 is comprised of amplifiers 65a, 65b for AC-amplifying the AC voltage signals from the electrodes 52a, 52b of the detector 5a and an amplifier 65c for synthesizing the AC voltage signals amplified by the amplifiers 65a, 65b and outputting them as an AC flow velocity signal 65s.

The sample hold section 66 is comprised of a first sample hold circuit consisting of a switch 66a, a resistance 66c and a capacitor 66e, a second sample hold circuit consisting of a switch 66b, a resistance 66d and a capacitor 66f and a differential amplifier 66g. The sample hold section 66 of such configuration samples the AC flow velocity signal 65s according to the sampling signals 64s, 64t outputted from the sampling control section 64 and outputs it as a DC flow velocity signal 66s.

The A/D converter 67 converts the DC flow velocity signal 66s outputted from the sample hold section 66 into a digital signal. The processor 68 processes the digital signal outputted from the A/D converter 67 so as to calculate an average flow in the filling pipe 2a. The output section 69 outputs the digital signal indicating the average flow outputted from the processor 68 to a control section 8a shown in FIG. 1.

Of the above configuration, the synchronous signal generating section 62, the sampling control section 64 and the processor 68 are implemented by a CPU.

While the configuration of the electromagnetic flow meter comprised of the detector 5a and the converter 6a is described here, the electromagnetic flow meters comprised of the detectors 5b to 5n and the converters 6b to 6n respectively also have the same configuration. And exciting frequency setting means for setting an exciting frequency in each of said electromagnetic flow meters at a desired value is configured by the synchronous signal generating section 62 that is set at ON of the converter 6a, and synchronization means for synchronizing excitation timing in each of said electromagnetic flow meters is configured by the synchronous signal line 7 and the exciting sections 63 of the converters 6a to 6n.

Ad Next, operation of the electromagnetic flow meter comprised of the detector 5a and the converter 6a shown in FIG. 2 will be described.

FIG. 3 is a timing chart showing signals of the sections of the electromagnetic flow meter shown in FIG. 2, where (A) is the clock signal 61s outputted from the clock signal generating section 61, (B) is the synchronous signal 62s outputted from the synchronous signal generating section 62, (C) is the exciting voltage 63v applied by the exciting section 63, (D) is the AC flow velocity signal 65s outputted from the amplifier 65, (E) and (F) are the sampling signals 64s, 64t outputted from the sampling control section 64, and (G) is the DC flow velocity signal 66s outputted from the sample hold section 66.

In addition, FIG. 4 is a timing chart showing a phase relationship between the exciting voltages 63v of the converters 6a, 6b of the electromagnetic flow meters provided for the adjacent filling pipes 2a, 2b respectively, where (A) is the exciting voltage 63v of the converter 6b and (B) is the exciting voltage 63v of the converter 6a.

In the synchronous signal generating section 62, the clock signal 61s of 8 MHz, for instance, as shown in FIG. 3(A) undergoes frequency division so as to generate the synchronous signal 62s of 170 Hz, for instance, as shown in FIG. 3(B). The synchronous signal 62s generated by the synchronous signal generating section 62 is given to the exciting section 63 and the sampling control section 64 of the converters 6a, and is also given to the exciting sections 63 and the sampling control sections 64 of the converters 6b to 6n via the synchronous signal line 7.

From the exciting section 63, the exciting voltage 63v comprised of rectangular waves of 20-V amplitude as shown in FIG. 3(C), for instance, is applied to the exciting coils 51a, 51b of the detector 5a. As the polarity of this exciting voltage 63v is switched in synchronization with the synchronous signal 62s, the frequency of the exciting voltage 63v becomes 85 Hz. Therefore, an alternating field of 85 Hz is generated from the exciting coils 51a, 51b.

If the alternating field is applied to the fluid in the filling pipe 2a, electromotive force having an amplitude proportionate to average flow velocity is generated by electromagnetic induction in a direction orthogonal to both the directions of the magnetic field and of the flow of the fluid. The AC voltage signal based on this electromotive force is taken out by a pair of electrodes 52a, 52b and AC-amplified by the amplifier 65, and then is outputted as the AC flow velocity signal 65s to the sample hold section 66.

On the other hand, the exciting sections 63 of all the converters 6a to 6n operate in synchronization with the synchronous signal 62s. Thus, the phases of the exciting voltages 63v applied by the exciting sections 63 of all the converters 6a to 6n respectively coincide perfectly as shown in FIG. 4(A) and (B) for instance. As differential noise occurs when the polarity of the exciting voltage 63v switches, the differential noise caused by the exciting voltages 63v of the converters 6a to 6n occurs simultaneously in this case. For this reason, even if the differential noise from the adjacent electromagnetic flow meter (the converter 6b for instance) is superimposed on the AC voltage signal based on the electromotive force, a spike appears in the AC flow velocity signal 65s only at the beginning of each pulse as shown in FIG. 3(D). Therefore, it is possible to prevent the spike from being sampled by setting sampling periods of the AC flow velocity signal 65s at the end of each pulse as shown in FIG. 3(E) and (F).

During the period when the sampling signals 64s are outputted from the sampling control section 64, the switch 66a of the sample hold section 66 is ON. For this reason, the end of the positive side of the AC flow velocity signal 65s is integrated with the resistance 66c and the capacitor 66e and inputted to a non-inverted input terminal (+) of the differential amplifier 66g. Likewise, as the switch 66b is ON during the period when the sampling signals 64t are outputted, the end of the negative side of the AC flow velocity signal 65s is integrated with the resistance 66d and the capacitor 66f and inputted to an inverted input terminal (−) of the differential amplifier 66g. In the differential amplifier 66g, a difference between the two input signals is taken, and the DC flow velocity signal 66s of which DC potential changes shown in FIG. 3(G) is generated according to the average flow velocity in the filling pipes 2a.

This DC flow velocity signal 66s include neither an error due to the differential noise caused by the exciting voltage 63v of the converter 6a nor an error due to the differential noise caused by the exciting voltages 63v of other converters 6a. To be more specific, the DC flow velocity signal 66s includes no indefinite error.

The DC flow velocity signal 66s outputted from an output terminal of the differential amplifier 66g is converted into a digital signal by the A/D converter 67 and then inputted to the processor 68. The processor 68 calculates the average flow by multiplying the average flow velocity in the filling pipe 2a indicated by the input signal by sectional area of the filling pipe 2a. The digital signal indicating this average flow is 85 Hz that is the same as the exciting frequency, and is outputted as a flow signal from the output section 69 to the control section 8a shown in FIG. 1.

FIG. 5 is a diagram showing a relationship between the flows (alternate long and short dash line) in the filling pipe 2a and the flow signals (solid lines) outputted from the converter 6a from opening till closing of the valve 3a. The horizontal axis of this diagram is time, and the vertical axis is the flow.

The control section 8 shown in FIG. 1 outputs the open signal to the valve 3a, and then totalizes the flows indicated by the flow signals sequentially outputted from the converter 6a of the electromagnetic flow meter. And it calculates a total sum of the fluid injected into the container la from this totalized value, and outputs the close signal to the valve 3a when the total sum reaches a set value. Thus, since the control section 8 estimates the amount of injection into the container la based on the flow signals from the converter 6a, it is preferable that there are a lot of the flow signals to be flow samples.

Figure 13:
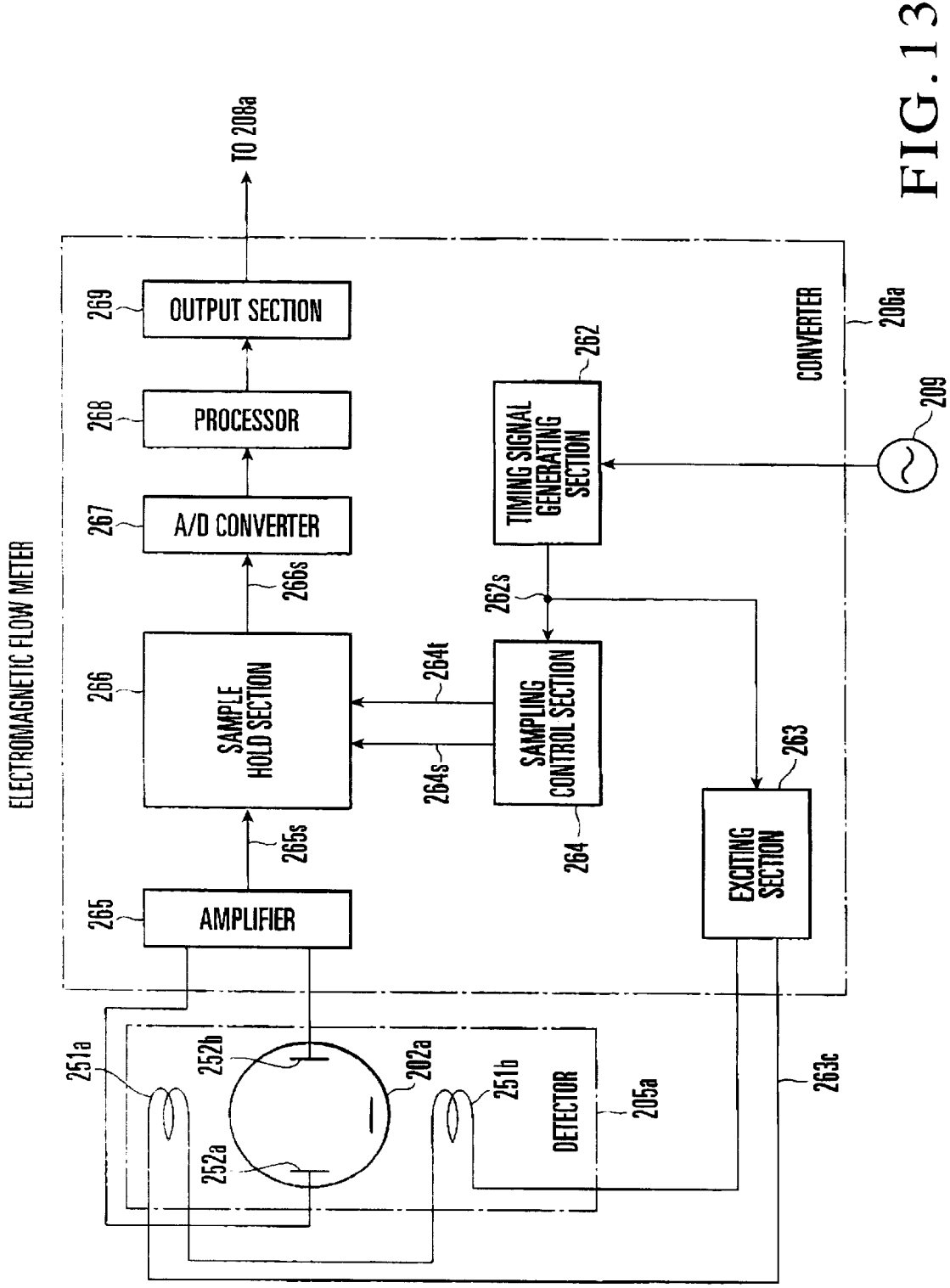
FIG. 13 is a block diagram showing an example of configuration of the electromagnetic flow meter.
Figure 14:
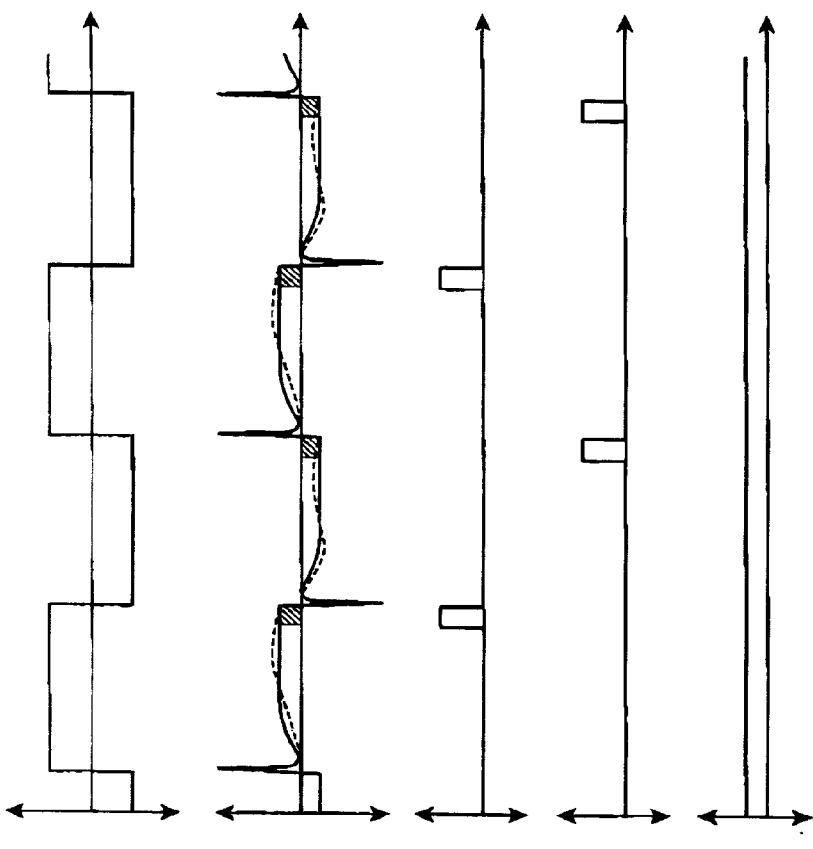
FIG. 14 is a timing chart showing signals of the sections of the electromagnetic flow meter shown in FIG. 13.
Figure 15:
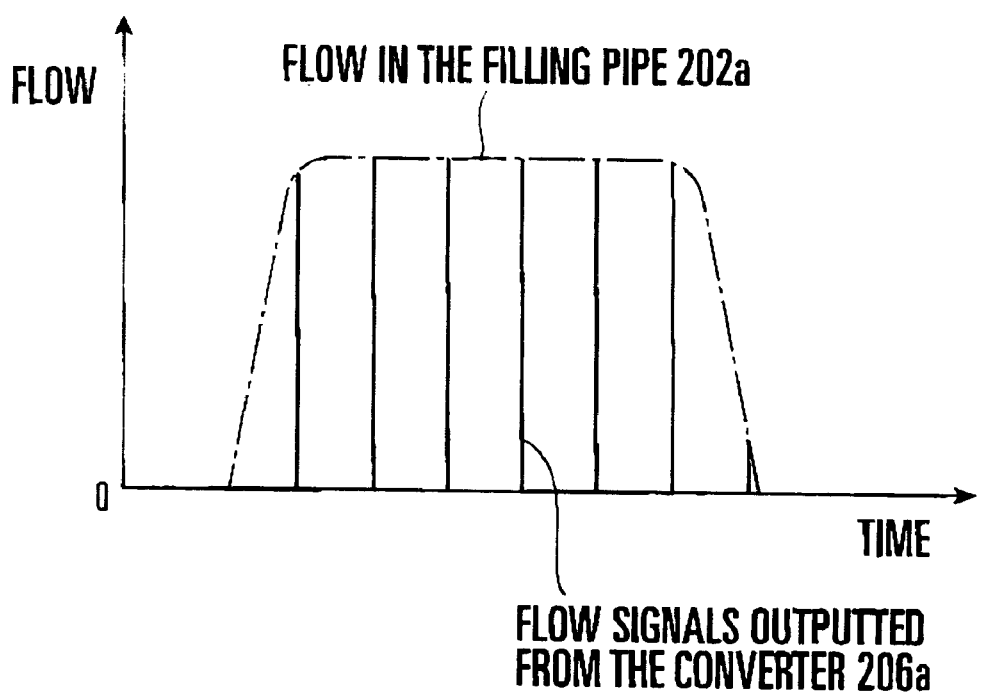
FIG. 15 is a diagram showing a relationship between the flow and the flow signals in the filling pipe.
Figure 16:
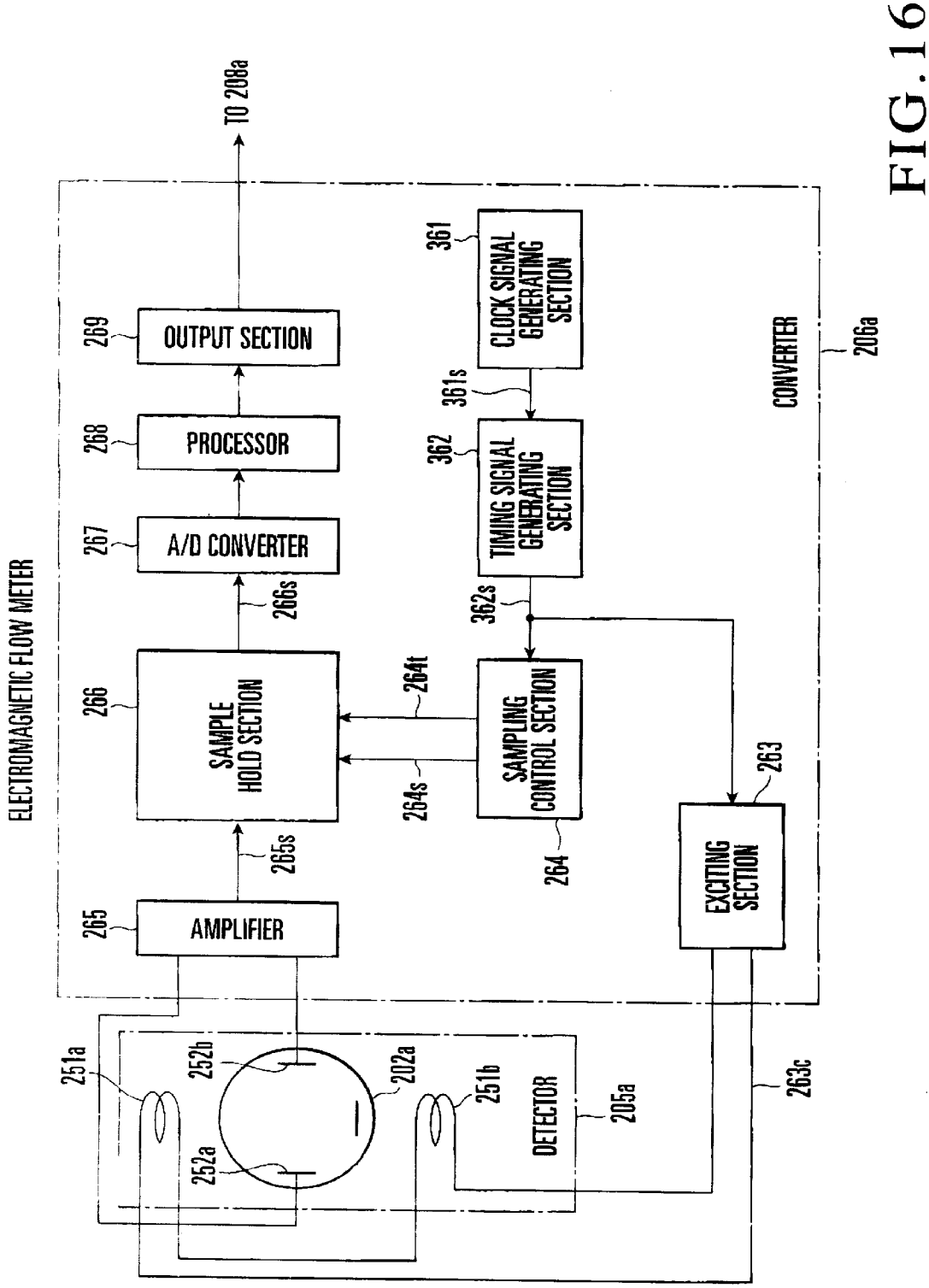
FIG. 16 is a block diagram showing another example of configuration of the electromagnetic flow meter.

If the conventional electromagnetic flow meter shown in FIG. 13 is put in contrast with the electromagnetic flow meter shown in FIG. 2, the exciting frequency of the former is 25 Hz or 30 Hz at most while that of the latter is 85 Hz. Therefore, it is possible to control amounts of filling more correctly with the filling machine using the electromagnetic flow meter shown in FIG. 2 than with a conventional machine.

As mentioned above, it is possible, by using the electromagnetic flow meter of the configuration shown in FIG. 2, to eliminate from a measured flow an Indefinite error occurring due to the differential noise in the adjacent electromagnetic flow meter even if the exciting frequency is rendered higher than the conventional cases. For this reason, even in the case of reducing the time for filling the container 1a with fluid and also in the case of filling the small container 1a with fluid, it is possible to fill a fixed amount of fluid among a plurality of the containers 1a that are sequentially filled with the fluid from the filling pipe 2a. Thus, good reproducibility can be acquired even in such a case by using the electromagnetic flow meter shown in FIG. 2.

Furthermore, as there is no indefinite error included in the measured flows from all the converters 6a to 6n, it is possible to precisely fill a fixed amount of fluid among the containers 1a to in that are simultaneously filled.

While the case of setting the exciting frequency at 85 Hz is taken as an example in the above description, a desired frequency can be implemented by adjusting the ratio at which the synchronous signal generating section 62 shown in FIG. 2 performs frequency division of the clock signal 1s. For instance, in the case of setting the exciting frequency at 135 Hz, the synchronous signal 62s of 270 Hz should be generated by the synchronous signal generating section 62.

While the case of generating the synchronous signals by the converter 6a and distributing them to the other converters 6b to 6n is taken as an example in the above description, the subject for generating the synchronous signals can also be switched to the other converters 6b to 6n. For instance, the synchronous signal generating section 62 of the converter 6b should be ON and the synchronous signal generating section 62 of the converter 6a should be OFF together with the synchronous signal generating sections 62 of the other converters 6c to 6n. In this case, the synchronous signal generating section 62 of the converter 6a does not operate, and the synchronous signals inputted from the other converter 6b via the synchronous signal line 7 and the synchronous signal input-output terminal 70 are given to the exciting section 63 and the sampling control section 64 of the converter 6a.

Moreover, while excitation is performed by using the exciting voltage 63v comprised of rectangular waves in the electromagnetic flow meter shown in FIG. 2, waveforms of the exciting voltage are not limited thereto. FIG. 6 is a timing chart showing signals of the sections of the electromagnetic flow meter in the case where excitation is performed by using the exciting voltage 63vv of other waveforms, where (A) is the exciting voltage 63vv applied by the exciting section 63, (B) is the AC flow velocity signal not including a spike by the differential noise, (C) is the AC flow velocity signal 65ss outputted from the amplifier 65, (D) and (E) are the sampling signals 64ss, 64tt outputted from the sampling control section 64 respectively, and (F) is the DC flow velocity signal 66ss outputted from the sample hold section 66.

As shown in FIG. 3(D), if polarity of the exciting current 63c comprised of rectangular waves switches, it takes predetermined time before a state of the AC flow velocity signal 65s becomes stable. For this reason, the AC flow velocity signal 65s is sampled only after it has become stable.

The exciting voltage 63vv shown in FIG. 6(A) has a waveform wherein the state of the AC flow velocity signal 65s becomes stable in a short time as shown in FIG. 6(B). To be more specific, the amplitude of the exciting voltage 63vv is set at $V_H$ first, and then is lowered to $V_L$ ($0<V_L<V_H$), and the polarity is switched to $-V_H$ and it is raised to $-V_L$. If the state of the AC flow velocity signal 65s becomes stable in a short time, it is possible to render the sampling periods longer as shown in FIG. 6(D) and (E). This makes the DC potential of the DC flow velocity signal 66ss relatively larger as shown in FIG. 6(F). Thus, it becomes possible to measure the flow in the filling pipe 2a more precisely by performing excitation with the exciting voltage 63vv of the waveform shown in FIG. 6(A).

Second Embodiment

In the filling machine of the second embodiment of the present invention, the timing signal for determining the excitation timing is individually generated by each of the electromagnetic flow meters, and the timing of the timing signal is periodically corrected based on the AC signals acquired in common by all the electromagnetic flow meters so as to synchronize the excitation timing of all the electromagnetic flow meters. This filling machine can be configured by providing timing correction means to each of the converters 6a to 6n of the filling machine shown in FIG. 1. Moreover, it is not necessary to connect the converters 6a to 6n by the synchronous signal line 7. The electromagnetic flow meter used for the filling machine of the second embodiment of the present invention will be described in detail hereafter.

First, the case of providing the electromagnetic flow meter with AC power will be described.

Figure 7:
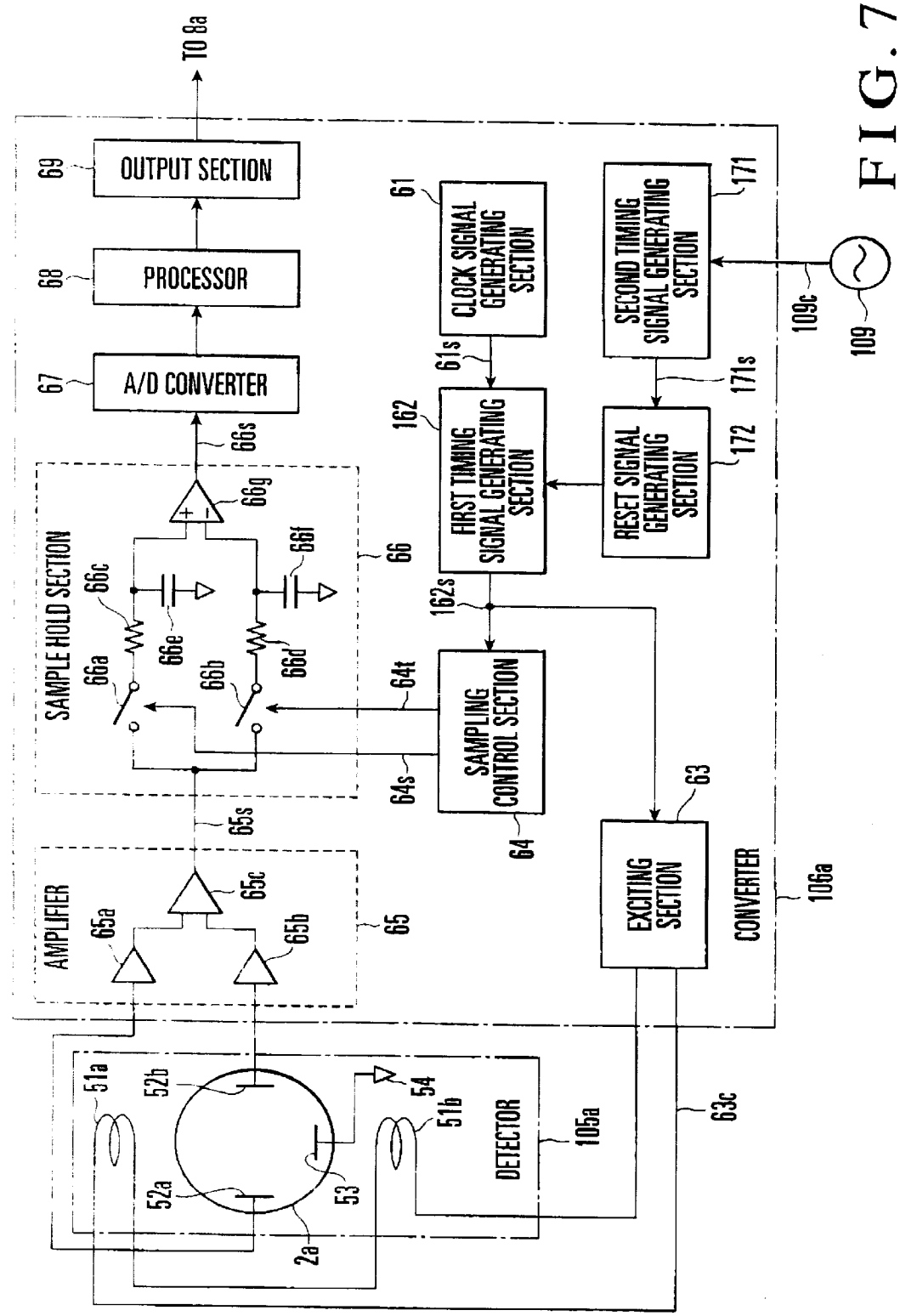
FIG. 7 is a block diagram showing an example of configuration of the electromagnetic flow meter used in the second embodiment of the present invention.
Figure 8A:
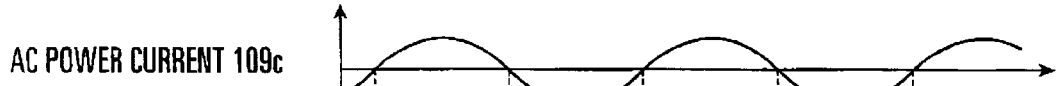
FIG. 8 is a timing chart showing operation of the second timing signal generating section of the electromagnetic flow meter shown in FIG. 7.
Figure 8B:
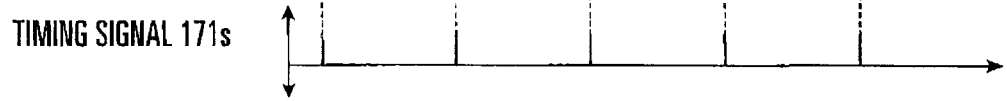
Figure 9:
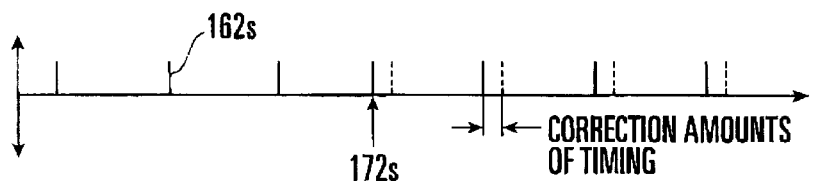
FIG. 9 is a timing chart showing operation of the first timing signal generating section of the electromagnetic flow meter shown in FIG. 7.

FIG. 7 is a block diagram showing an example of configuration of the electromagnetic flow meter. In addition, FIG. 8 is a timing chart showing operation of the second timing signal generating section of the electromagnetic flow meter shown in FIG. 7. Also, FIG. 9 is a timing chart showing operation of the first timing signal generating section of the electromagnetic flow meter shown in FIG. 7. FIG. 9 shows correction amounts of timing of a first timing signal 162s in an exaggerated manner for the sake of description.

While the electromagnetic flow meter shown in FIG. 7 is provided for the filling pipe 2a, the electromagnetic flow meters provided for the other filling pipes 2b to 2n respectively also have exactly the same configuration. Meanwhile, FIG. 7 shows the same sections as in FIG. 2 by using the same symbols and appropriately omits the description.

The converter 106a of the electromagnetic flow meter shown in FIG. 7 has an AC current (AC signal) 109c supplied from AC power 109 that is commercial power or the like. This AC power 109 supplies the AC current 109c in common to the converters of all the electromagnetic flow meters.

The second timing signal generating section 171 extracts a second timing signal 171s from the AC current 109c from the AC power 109. For instance, it is configured so that a pulse is generated when the amplitude of the AC current 109c becomes zero as shown in FIG. 8. In this case, if the AC power 109 is commercial power, the frequency of the second timing signal 171s is 100 Hz or 120 Hz.

The reset signal generating section 172 performs frequency division of the second timing signal 171s outputted from the second timing signal generating section 171 so as to generate a reset signal 172s. This reset signal 172s is outputted to a first timing signal generating section 162 in a predetermined cycle.

The first timing signal generating section 162 performs frequency division of a clock signal 61s outputted from a clock signal generating section 61 to generate a first timing signal 162s of a desired frequency. Normally, it outputs the first timing signal 162s and then counts a predetermined number of clock signals 61s, and outputs the next first timing signal 162s. However, if the reset signal 172s is inputted from the reset signal generating section 172, it outputs the next first timing signal 162s at that point in time as shown in FIG. 9. Therefore, even if there is an error in the frequency of the clock signal 61s deviating the timing of the first timing signal 162s, the timing is corrected by the reset signal 172s.

Here, if a set frequency of the first timing signal 162s is $f_1$ and that of the second timing signal 171s is $f_2$, a cycle T of the reset signal 172s is set to meet the equation (1), provided that a and b are mutually prime natural numbers.

$$T=a/f_1=b/f_2 \qquad (1)$$

For instance, in the case where the exciting frequency is set at 85 Hz and commercial power of 50 Hz is used as the AC power 109, it is $f_1$=170 Hz, $f_2$=100 Hz so that it is a=17, b=10 and the cycle T of the reset signal 172s is 0.1 sec.

If the cycle T of the reset signal 172s is set in this manner, the reset signal 172s is outputted at the point in time when the timing of said first timing signal 162s and the timing of said second timing signal 172s approximately correspond with each other. This can hold down the correction amount of the timing of the first timing signal 162s to a minimum, and so continuity of the first timing signal 162s can be maintained.

Moreover, in setting the cycle T of the reset signal 172s, the equation (1) does not have to be strictly met and it can be within an acceptable range. In addition, the cycle of the reset signal 172s can also be a multiplication of the cycle T by a natural number meeting the equation (1).

In such configuration, all the frequencies of the first timing signals 162s generated by the respective electromagnetic flow meters are set at the same value. Besides, the timing of the first timing signal 162s is periodically corrected by each of the electromagnetic flow meters based on the AC current 109c acquired in common by all of the electromagnetic flow meters so as to synchronize the timing of the first timing signal 162s of each of the electromagnetic flow meters. The first timing signal 162s is outputted to both the exciting section 63 and the sampling control section 64 and becomes a reference to operation thereof. Therefore, the excitation timing of all the electromagnetic flow meters can be synchronized.

In this case, the phases of the first timing signals 162s of the respective electromagnetic flow meters do not need to correspond with each other. FIG. 10 is a timing chart indicating a phase relationship between the first timing signals 162s of the converters 106a, 106b of the electromagnetic flow meters provided for the adjacent filling pipes 2a, 2b respectively, where (A) is the first timing signals 162s of the converter 6b, (B) and (C) are the first timing signals 162s and the AC flow velocity signal 65s of the converter 6a respectively.

Figure 10A:
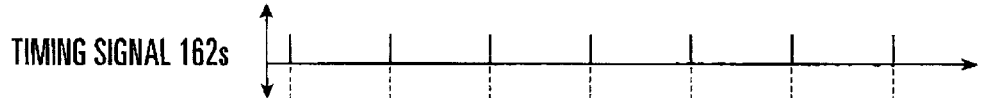
FIG. 10 is a timing chart indicating a phase relationship between the first timing signals of the converters of the electromagnetic flow meters provided for the adjacent filling pipes.
Figure 10B:
Figure 10C:

As shown in FIG. 10(A) and (B), even if the phases of the first timing signals 162s of the converters 106a, 106b do not correspond with each other, the phase difference between them is maintained. Therefore, even if the timing of the first timing signal 162s in the converter 106b is included in the sampling periods (the diagonally shaded areas in FIG. 10(C)) of the AC flow velocity signal 65a in the converter 106a, an error due to the differential noise from the adjacent electromagnetic flow meter is equally included in the flow signals sequentially outputted from the converter 106a. Thus, in the case of only seeing a system including the converter 106a, that is, the system comprised of the filling pipes 2a, the detector 105a, the converter 106a, the control section 8a and the valve 3a, the amount of filling of the container 1a has reproducibility. Therefore, it is possible, by individually adjusting the control sections 8a to 8n before operation of the filling machine, to fill all the containers 1a to 1n with a fixed amount of the fluid Furthermore, as the exciting frequency of each of the electromagnetic flow meters is set at a desired value at the respective first timing signal generating sections 162, the filling machine using the electromagnetic flow meter shown in FIG. 7 is effective in the case of reducing the time for filling the containers 1a to 1n with fluid or in the case of filling the small containers 1a to 1n with fluid.

On the other hand, in the case of the filling machine using the electromagnetic flow meter shown in FIG. 7, it is not necessary to connect the converters 6a to 6n by the synchronous signal line 7. Therefore, in the case where one of the plurality of converters 6a to 6n is out of order, it is sufficient to replace only the faulty converter.

Moreover, in the electromagnetic flow meter shown in FIG. 7, exciting frequency setting means for setting an exciting frequency in each of the electromagnetic flow meters at a desired value is constituted by the first timing signal generating section 162 of each of the electromagnetic flow meters, and synchronization means for synchronizing excitation timing in each of the electromagnetic flow meters is constituted by the second timing signal generating section 171, the reset signal generating section 172, the first timing signal generating section 162 (they comprise the timing correction means) and the exciting section 63.

Next, the case where the electromagnetic flow meter is driven by DC power with no AC power supplied will be described.

Figure 11:
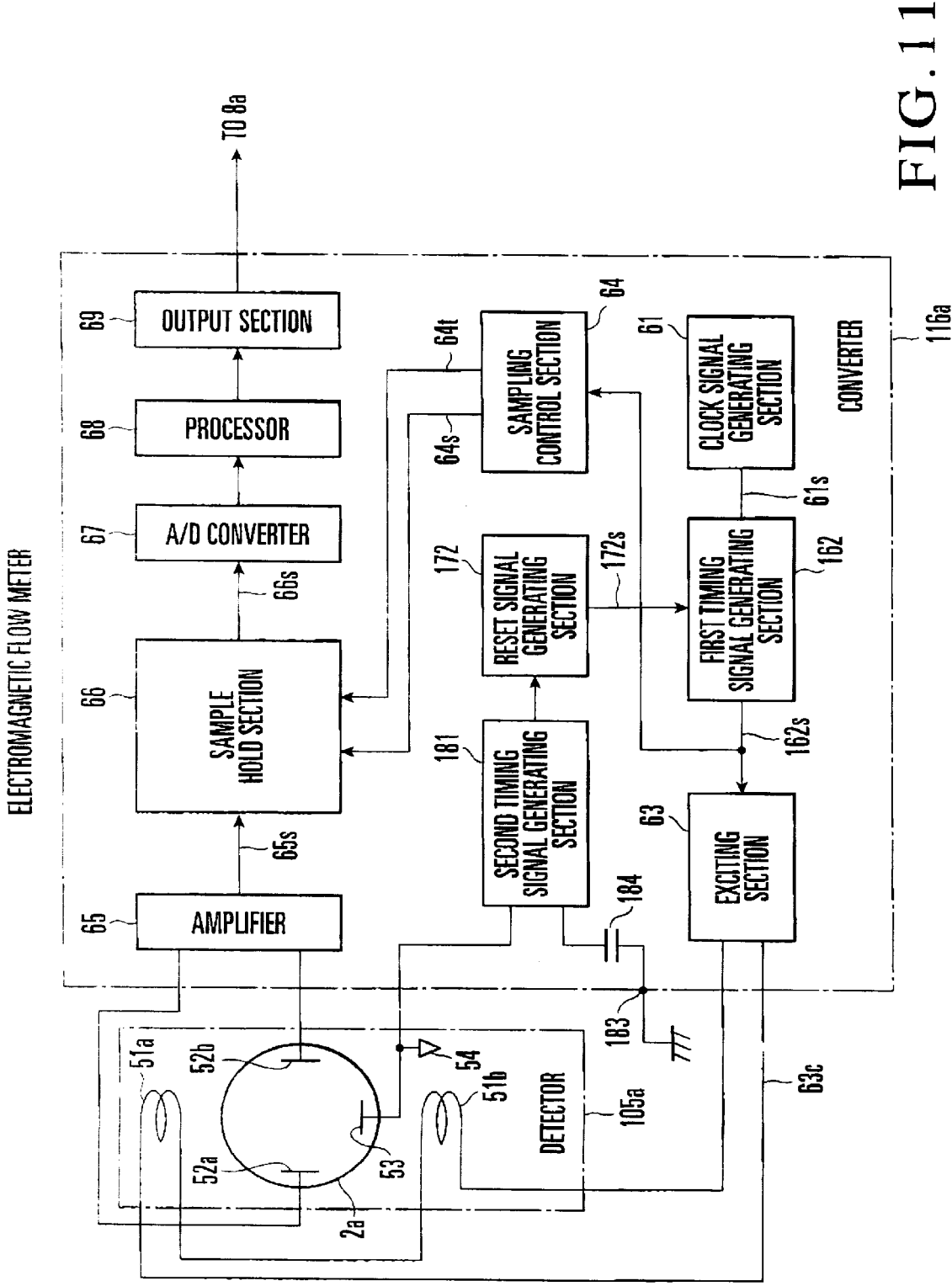
FIG. 11 is a block diagram showing another configuration of the electromagnetic flow meter used for the filling machine of the second embodiment of the present invention.
Figure 12:
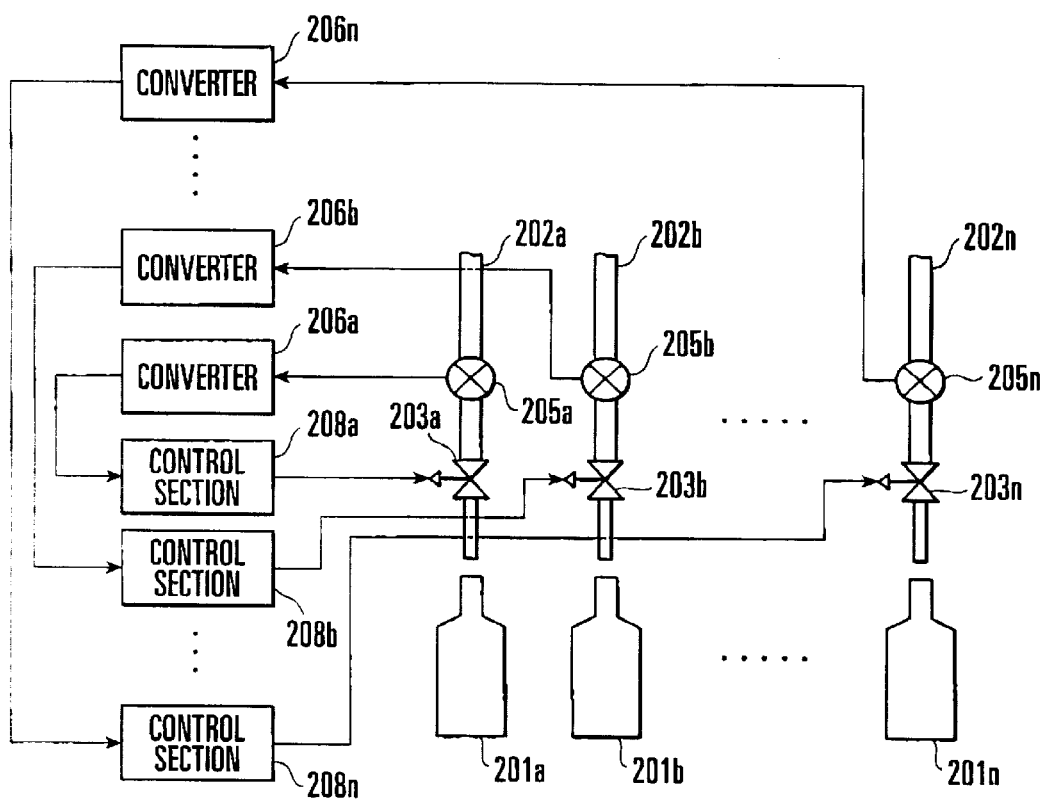
FIG. 12 is a block diagram showing overall configuration of a conventional filling machine using the electromagnetic flow meter.

FIG. 11 is a block diagram showing another configuration of the electromagnetic flow meter. While the electromagnetic flow meter shown in this diagram is provided for the filling pipe 2a, the electromagnetic flow meters provided for the other filling pipes 2b to 2n respectively also have exactly the same configuration. Moreover, FIG. 11 shows the same sections as in FIGS. 2 and 7 by using the same symbols and appropriately omits the description.

As this electromagnetic flow meter has no AC power supplied, AC noise (AC signal) generated by the AC current outputted from one AC power such as commercial power is utilized. This AC noise propagates through the filling pipes 2a to 2n.

The input side of a second timing signal generating section 181 is connected to the reference potential 54 of a detector 105a and also to a case potential (usually an earth potential) 183 of a converter 116a via an input condenser 184. The second timing signal generating section 181 detects the above AC noise from a potential difference between the two potentials 54 and 183. And then, like the second timing signal generating section 171 shown in FIG. 7, it extracts a second timing signal 181s from the detected AC noise and outputs it to the reset signal generating section 172. Other configuration is the same as that of the electromagnetic flow meter shown in FIG. 7.

Thus, it is possible, even in the case of the electromagnetic flow meter driven by DC power, to acquire the same effect as the case of using the electromagnetic flow meter shown in FIG. 7 by utilizing the AC noise distributed in the filling pipes 2a to 2n.

Meanwhile, means for detecting the AC noise from piping is described in the Japanese Patent Application Laid-Open No. Hei-6-160138, and the electromagnetic flow meter shown in FIG. 11 can utilize all the means for detecting the AC noise described in the above application.

As described above, the filling machine of the present invention has the exciting frequency setting means for setting the exciting frequency in each of the electromagnetic flow meters at a desired frequency and the synchronization means for synchronizing the excitation timing in each of the electromagnetic flow meters. Such configuration can synchronize excitation timing among the electromagnetic flow meters even if the exciting frequency is set higher than 25 Hz or 30 Hz. For this reason, it can prevent the flow signal from including an indefinite error due to the differential noise from the adjacent electromagnetic flow meter. Thus, it is possible to acquire good reproducibility as to the amount of filling even in the case of reducing the time for filling the containers with fluid or in the case of filling a small container with fluid.

In addition, it supplies the synchronous signal generated by one electromagnetic flow meter to the other electromagnetic flow meters via the synchronous signal line, and synchronizes with this synchronous signal the excitation of all the electromagnetic flow meters. Thus, it can synchronize the electromagnetic flow meters without making a substantial change to the conventional configuration of the electromagnetic flow meters. In this case, it can precisely fill with a fixed amount of fluid all the containers to be simultaneously filled.

Moreover, it individually generates the first timing signal with each of the electromagnetic flow meters, and periodically corrects the timing of the first timing signal based on the AC signal acquired in common by all of the electromagnetic flow meters so as to synchronize the excitation of all the electromagnetic flow meters. As it is not necessary to connect the electromagnetic flow meters by the synchronous signal line, it is sufficient to replace only the faulty converter in the case where one of the plurality of the electromagnetic flow meters is out of order.

In addition, continuity of the first timing signal can be maintained by correcting the timing of the first timing signal at the point in time when the timing of the first timing signal and the timing of the second timing signal extracted from the AC signal approximately correspond with each other.

What is claimed is:

1. A filling machine comprising:
   a plurality of filling pipes placed in proximity to each other for injecting fluid into each of a plurality of containers;
   a valve provided for each of said filling pipes for opening and closing each of said filling pipes based on an open and a close signal respectively;

an electromagnetic flow meter provided for each of said filling pipes for calculating a flow based on electromotive force generated by applying an alternating magnetic field to said fluid in each of said filling pipes and outputting a flow signal;

control means for outputting said open signal to each of said valves, and also outputting said close signal to each of said valves based on said flow signal outputted from each of said electromagnetic flow meters after outputting said open signal so as to fill each of said containers with a fixed amount of said fluid;

exciting frequency setting means provided in only one of said electromagnetic flow meters for generating a synchronous signal having a desired frequency; and synchronization means for transmitting said synchronous signal to all the other electromagnetic flow meters for performing excitation in synchronization with said synchronous signal.

2. A filling machine according to claim 1 wherein said synchronization means is comprised of a synchronous signal line.

3. A filling machine according to claims 1 or 2, wherein said desired frequency of the synchronous signal is higher than 25 Hz or 30 Hz by performing frequency division of a clock signal of said electromagnetic flow meter.

\* \* \* \* \*